Figure 1:
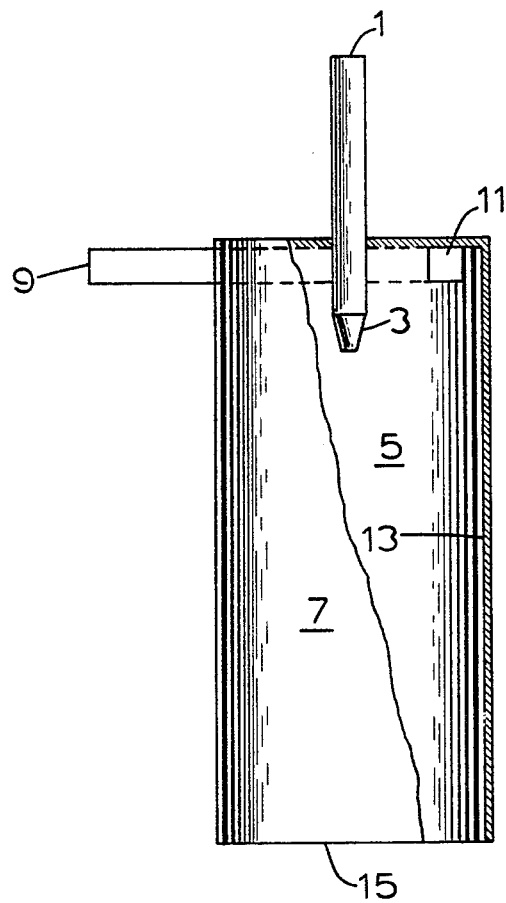

July 9, 1968 E. J. HOLLAND, JR 3,391,997

PYROGENIC SILICA PRODUCTION

Filed Dec. 21, 1964

2 Sheets—Sheet 1

3,391,997
PYROGENIC SILICA PRODUCTION
Edward J. Holland, Jr., Tuscola, Ill., assignor to Cabot Corporation, Boston, Mass., a corporation of Delaware
Filed Dec. 21, 1964, Ser. No. 419,966
6 Claims. (Cl. 23—182)

The present invention relates to the production of pyrogenic silicon dioxide and more specifically to an improved process for the production of pyrogenic silicon dioxide.

Pyrogenic particulate silicon dioxide has, in recent years, attained considerable importance as an item of commerce. Said material has found application as, for instance, a flatting agent for varnishes and lacquers, a thixotropic agent for paints and synthetic resins, a free-flow agent for various diverse powdered substances, a filler for various elastomers and plastics, etc.

Currently, pyrogenic silicon dioxide is generally produced by hydrolysis at elevated temperatures of volatilized silicon tetrachloride. Specifically silicon tetrachloride vapors are contacted at temperatures above about 800° F. with hydrogen and a free-oxygen containing gas. The following equation is believed to correctly illustrate the hydrolysis reaction that occurs:

$$SiCl_4 + O_2 + 2H_2 \rightarrow SiO_2 + 4HCl$$

One of the critical problems which has in the past beset the pyrogenic silicon dioxide producing industry resides in the fact that, during production particulate silicon dioxide product tends to "plate out" upon reaction chamber walls and burner apparatus. The resulting deposits can periodically drop off into the main product stream and thereby contaminate said product stream with substantial amounts of silicon dioxide which has been "aftertreated" by exposure to high temperatures for an excessively lengthy period. Also, excessive wall deposits introduce the risk of plugging the reaction chamber outlet when deposits break loose.

In accordance with the present invention, however, this problem has been substantially solved.

Accordingly, it is a principal object of the present invention to provide a novel process for the production of pyrogenic silicon dioxide.

It is another object of the present invention to provide an improved process for the production of pyrogenic silicon dioxide wherein deposition of silicon dioxide product on reaction chamber walls is substantially eliminated.

It is another object of the present invention to provide an improved process for the production of pyrogenic silicon dioxide having an average particle diameter of less than about 0.1 micron and preferably less than about 0.05 micron.

Other objects and advantages of the present invention will in part be obvious and will in part appear hereinafter.

In accordance with the present invention, it has been discovered that deposition of solid product on walls of a reaction chamber during production therein of pyrogenic silicon dioxide can be substantially eliminated by (1) introducing axially to an elongate reaction chamber gaseous reactant streams comprising (a) silicon halide vapors, preferably silicon tetrachloride vapor, (b) hydrogen gas, and (c) a free-oxygen containing gas; and (2) introducing a spinning stream of a secondary gas to said reaction chamber at a point upstream of the point of entry of said axially introduced stream.

Free-oxygen containing gases (i.e. gases containing uncombined oxygen) suitable for the purposes of the present invention are generally obvious. It should be noted that when free-oxygen containing gas mixtures are utilized comprising other gases in addition to the oxygen, said other gas(es) must be substantially inert with respect to the reactants and reaction products of the process. Preferred for use in the process of the present invention, however, are dry oxygen and/or dry air.

Suitable secondary gases are those gases which comprise (a) free-oxygen containing gases as hereinbefore described, (b) gases which are inert with respect to the reactant streams and reaction products of the process, or (c) mixtures thereof. Thus, in addition to free-oxygen containing gases such as air, other gases generally suitable for use as secondary gases in the process of the present invention are the classical inert gases of Group VIII of the Mendeleev Periodic System (helium, neon, argon, etc.) or other gases which are inert to the reactants and reaction products of the process such as nitrogen, recycled process gases and the like. Generally preferred because they are usually readily available and economical are air, recycled process gases and mixtures thereof.

Figure 2:
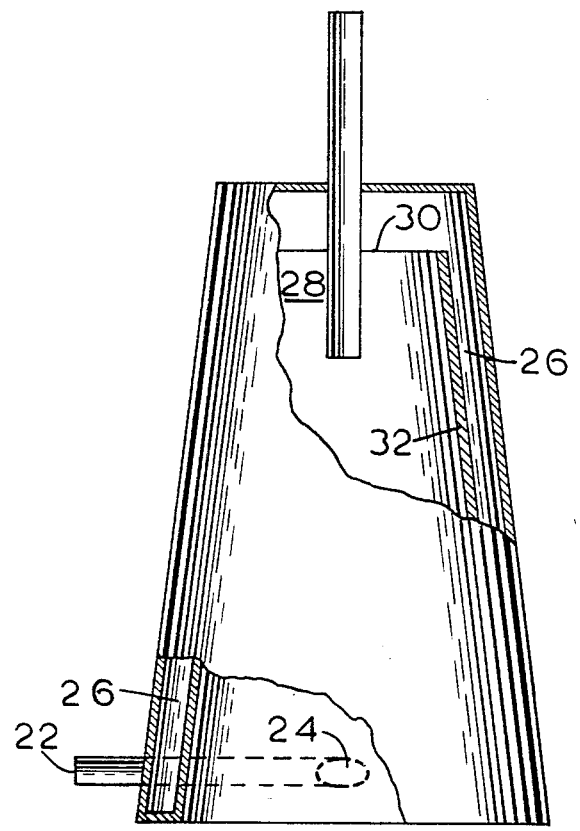

A better understanding of my invention can be had when reference is made to the drawings forming part hereof wherein:

FIGURE 1 represents a schematic diagrammatic longitudinal illustration of apparatus suitable for accomplishing the process of the present invention, and FIGURE 2 represents a schematic diagrammatic longitudinal illustration of another apparatus, suitable for the production of pyrogenic silicon dioxide in accordance with the process of the present invention.

In a typical pyrogenic silicon dioxide producing run, referring now to FIGURE 1, a gaseous mixture comprising hydrogen and a free-oxygen containing gas is introduced through conduit 1 and courses through nozzle means 3 into reaction chamber 5 wherein said mixture is burned, thereby preheating reaction zone 7. A secondary gas is simultaneously charged through conduit 9 and enters reaction chamber 5 through tangentially oriented inlet means 11 upstream from the point of entry of said gaseous mixture. Volatilized silicon tetrachloride is then charged to the hydrogen/free-oxygen containing gas mixture and there is produced within reaction zone 7 pyrogenic silicon dioxide.

Many operational parameters of the process of the present invention such as temperature of the reaction chamber, flow rates of reactants, etc., are dictated to a large extent by the design and dimensions of the production apparatus, the rate of silicon dioxide production desired, particular product qualities desired, etc. Said parameters are, therefore, subject to considerable variation and can be readily determined by those skilled in the art when considerations such as mentioned above are borne in mind.

Generally speaking, the flow rates of the gaseous reactants (i.e. silicon tetrachloride vapors, hydrogen, and free-oxygen containing gas) introduced axially to the reaction zone, are adjusted so as to provide at least sufficient hydrogen to react stoichiometrically with the silicon tetrachloride. Preferably, a slight excess of hydrogen (i.e. at least 5% by weight) is provided.

Several operational parameters are however, all important to the success of the present process and should therefore be well noted. It has been found important, for instance, that the ratio of the volume flow rate of the secondary gas stream to the volume flow rate of free-oxygen containing gas charged to the gaseous reactant mixture be at least about 0.9:1. Preferably, a ratio above about 1.2:1, for example about 1.5:1, or even greater should be utilized.

It has also been found to be important that the secondary gas achieve a minimum linear velocity of at least about 600 ft./min. at the point of entry thereof to the reaction chamber. Preferably a velocity of about 800 ft./min. or even higher is utilized. It should be further noted that it is important that the secondary gas be introduced to the reaction chamber at a point at least somewhat upstream from the point of entry of the retctant stream. When said secondary gas is introduced to the reaction chamber downstream from point of entry of said reactant stream, the resulting flame geometry can be adversely affected.

If any of the above-mentioned conditions are not provided, the substantial benefits achievable in accordance with the process of the present invention are either not realized at all or are vastly reduced.

There follow a number of illustrative non-limiting examples:

Example 1

To a reaction chamber of the general type illustrated in FIGURE 1 having a diameter of about 16" and equipped with tangentially oriented rectangular secondary gas inlet means 11 (6" x 3") positioned 6" to 12" upstream of the plane described by said exit orifice perpendicular to the axis thereof, there is charged through conduits 9 and 1 respectively about 8125 s.c.f.h. of atmospheric air and 5410 s.c.f.h. of dry air which provides a volume flow rate of secondary gas to axially charged free-oxygen containing gas of about 1.4:1. The calculated linear velocity of the secondary gas introduced to chamber 5 is about 1090 ft./min. Next, hydrogen is also introduced into conduit 1 at a rate of 2370 s.c.h.f. and the resulting mixture is ignited within reaction chamber 5. The combustion of said mixture is allowed to continue for about 30 minutes and there is then charged to conduit 1, in addition to the hydrogen and dry air already flowing therethrough, about 450 lbs./hour of vaporized silicon tetrachloride. The reaction is allowed to continue for about 12 hours, during which time the reaction products are withdrawn through outlet 15, and it is found that there is continuously produced about 160 lbs./hour of silicon dioxide having an average particle diameter of about 0.013 micron. Said product is found to comprise only a few particles having a diameter greater than about 0.020 micron. Upon shutdown, reaction chamber wall 13 is examined and it is found that only a dusting of silicon dioxide has been deposited.

The next example is presented to illustrate the effects which can occur when the linear velocity of the secondary gas stream is maintained below about 600 ft./min. at the point of entry thereof to the reaction chamber.

Example 2

This example is essentially a duplicate of Example 1 with the exception that after startup of the silicon dioxide producing reaction, the flow rate of the secondary gas stream is reduced to about 4060 s.c.h.f. which provides a volume flow rate ratio of secondary gas to the axially charged free-oxygen containing gas of about 0.75:1 and a calculated linear velocity of said secondary gas stream at the point of entry thereof to the reaction chamber of about 535 ft./min. After about two hours of operation at these conditions, shutdown is necessitated by excessive deposition of silicon dioxide on reaction chamber wall 13. The silicon dioxide product collected is analyzed and it is found that said product has an average particle diameter of about 0.013 micron but contains quantities of oversize particles having diameters above 44 microns.

Obviously, many changes can be made in the above examples and description and in the accompanying drawings without departing from the scope of the present invention.

For instance, although only air was utilized as the secondary gas in the above examples, other free-oxygen containing gases or gases which are inert with respect to the reactants and reaction products are also suitable. For example, helium, nitrogen, recycle process gases, etc., are also suitable secondary gases.

Although only the apparatus described in FIGURE 1 was utilized in the above examples, clearly other apparatus such as the type illustrated in FIGURE 2 is also suitable. Referring now to FIGURE 2, in a typical run, secondary gas which is charged through conduit 22 and tangentially oriented inlet 24, courses in spiral fashion through annulus 26 and enters reaction chamber 28, still spinning, through reaction chamber throat 30. By use of this type of apparatus, said secondary gas can at once both cool reaction chamber walls 32 and be itself preheated as said gas courses through said annulus.

Furthermore, other free-oxygen containing gases, such as oxygen alone, or mixtures of oxygen with inert gases such as nitrogen or helium can comprise the free-oxygen containing gas stream introduced axially as a portion of the reactant stream. It should be noted and understood that when it is desired that any of the gas streams be diluted without greatly disturbing the volume flow rate thereof, said gas streams can be diluted with an inert dry gas. For instance, the silicon tetrachloride vapor stream can be diluted with dry nitrogen in order to dilute said stream or to provide a carrier gas for said vapors.

Accordingly, it is intended that the present disclosure be regarded as illustrative and as in no way limiting the scope of the invention.

What I claim is:

1. An improved process for the production of silicon dioxide which comprises charging axially into a heated enclosed reaction zone gaseous reactant streams comprising (a) silicon halide, (b) hydrogen and (c) a free-oxygen containing gas and introducing into said enclosed reaction zone and upstream from the point of entry of said reactant streams a spinning stream of a secondary gas at a linear velocity of greater than about 600 ft./min. and at a volume flow rate of at least $9/10$ of the volume flow rate of said free-oxygen containing gas stream.

2. The process of claim 1 wherein said silicon halide is silicon tetrachloride.

3. The process of claim 1 wherein said free-oxygen containing gas is air.

4. The process of claim 1 wherein said secondary gas is air.

5. The process of claim 1 wherein said secondary gas is introduced at a linear velocity of above about 800 ft./min.

6. The process of claim 1 wherein the volume flow rate of said secondary gas is greater than about $12/10$ of the flow rate of said free-oxygen containing gas.

References Cited

UNITED STATES PATENTS 2,823,982  2/1958  Saladin et al. _____ 23—182

FOREIGN PATENTS 726,250  3/1955  Great Britain.

OSCAR R. VERTIZ, *Primary Examiner.*

ARTHUR J. GREIF, *Assistant Examiner.*